United States Patent [19]

Langieri, Jr. et al.

[11] 3,755,924

[45] Sept. 4, 1973

[54] ARITHMETIC TEACHING DEVICE

[75] Inventors: Michael Langieri, Jr., Butler, N.J.;
MIchael Meyers, Monsey, N.Y.

[73] Assignee: Questor Corporation, Toledo, Ohio

[22] Filed: Aug. 3, 1972

[21] Appl. No.: 277,500

[52] U.S. Cl. .................................................. 35/32
[51] Int. Cl. .......................................... G09b 19/02
[58] Field of Search................ 35/31 R, 31 B, 31 E, 35/32, 30, 33

[56] References Cited
FOREIGN PATENTS OR APPLICATIONS
179,113   7/1954   Austria .................................. 35/33

Primary Examiner—Wm. H. Grier
Attorney—Donald R. Bahr

[57] ABSTRACT

An arithmetical teaching device having an elongated housing with a plurality of aligned slidable buttons secured therein. The buttons have transparent faces. Indicia is printed on the interior base of each of the buttons. One space equivalent to the size of one button is provided so that the movement of the buttons may be accomplished. The lowest number indicia is printed on the interior base of the housing at one end thereof. Each of the buttons except one includes opaque means extending from within the buton for covering and uncovring the indicia of an adjacent button as they are moved in one direction and the other within the housing.

4 Claims, 7 Drawing Figures

Patented Sept. 4, 1973

Patented Sept. 4, 1973
3,755,924
2 Sheets-Sheet 2
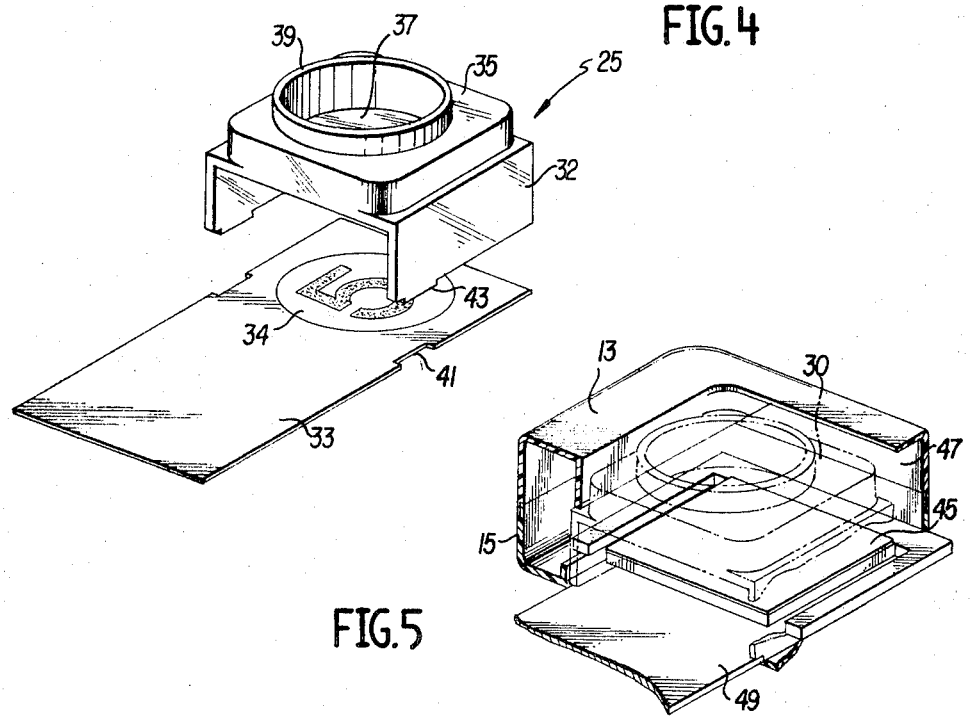
FIG. 4
FIG. 5
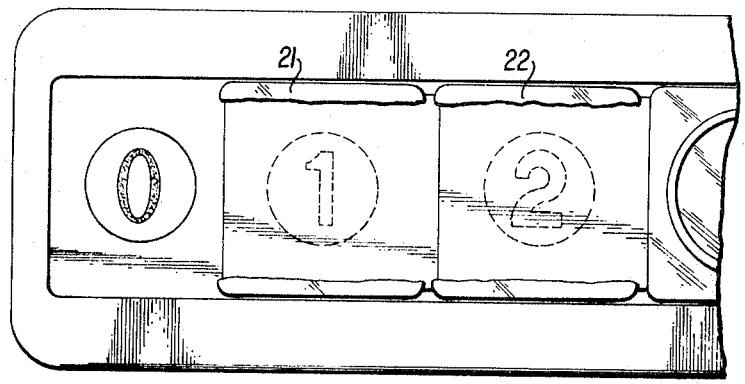
FIG. 6
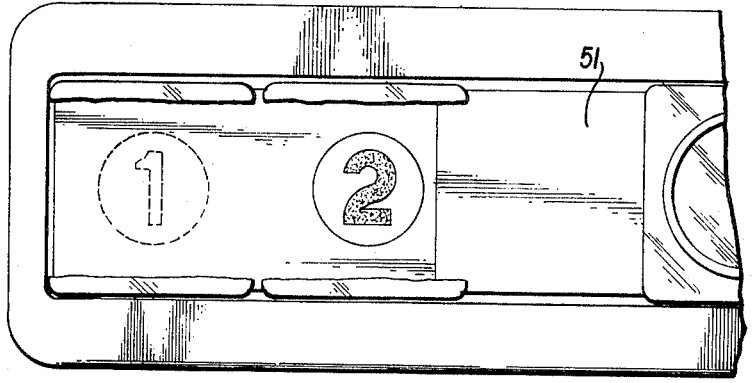
FIG. 7

ARITHMETIC TEACHING DEVICE

This invention relates generally to arithmetic teaching devices and more specifically to a simple mechanical device adapted for teaching small children basic counting, addition and subtraction.

Children have always been taught their numbers such as addition and subtraction through the use of visual aids, fingers, marking with pencils and other combinations and devices. They have also used various implements such as blocks with numbers theron, cards having the necessary indicia and other devices all of which aid in the very basic teaching concepts.

In the present day world of mechanical devices such as adding machines, calculators, etc., it is desirable to have very early childhood training in numbers associated with some rather simple mechanical devices so that the child may become accustomed to the use of such devices as he proceeds into the more complicated mathematical world.

Accordingly, it is an object of this invention to provide a simple mechanical arithmetical teaching device for small children.

It is a further object of this invention to provide a mechanical arithmetical teaching device having a few parts which may be easily moved by a small child.

Yet another object of this invention is to provide a simple mechanical arithmetical teaching device directed towards the teaching of counting, addition and subtraction in the lower number range.

These and other objects will become apparent from the following description when taken in conjunction with the drawings wherein FIG. 1 is a perspective view of the preferred embodiment of the present invention;

FIG. 4 is an exploded view of one of the slidable buttons used in the present invention;

FIG. 5 is a partial sectional view of one end of the device as shown in FIG. 1; and FIGS. 6 and 7 are partial views illustrating the operation of the device of the present invention.

Broadly speaking, the present invention provides an arithmetical teaching device which comprises a housing having a plurality of slidable buttons secured therein in substantial alignment. The buttons are provided with transparent faces. Indicia is printed on the interior base of each of said buttons. A space is provided for moving each button which would originally be at one end of the device with the lowest digit such as "0" being imprinted on the base of the housing at that location. Each of the buttons except one also includes opaque means extending from within the button for covering and uncovering the indicia of the adjacent button as they slide back and forth in the housing.

Figure 1:
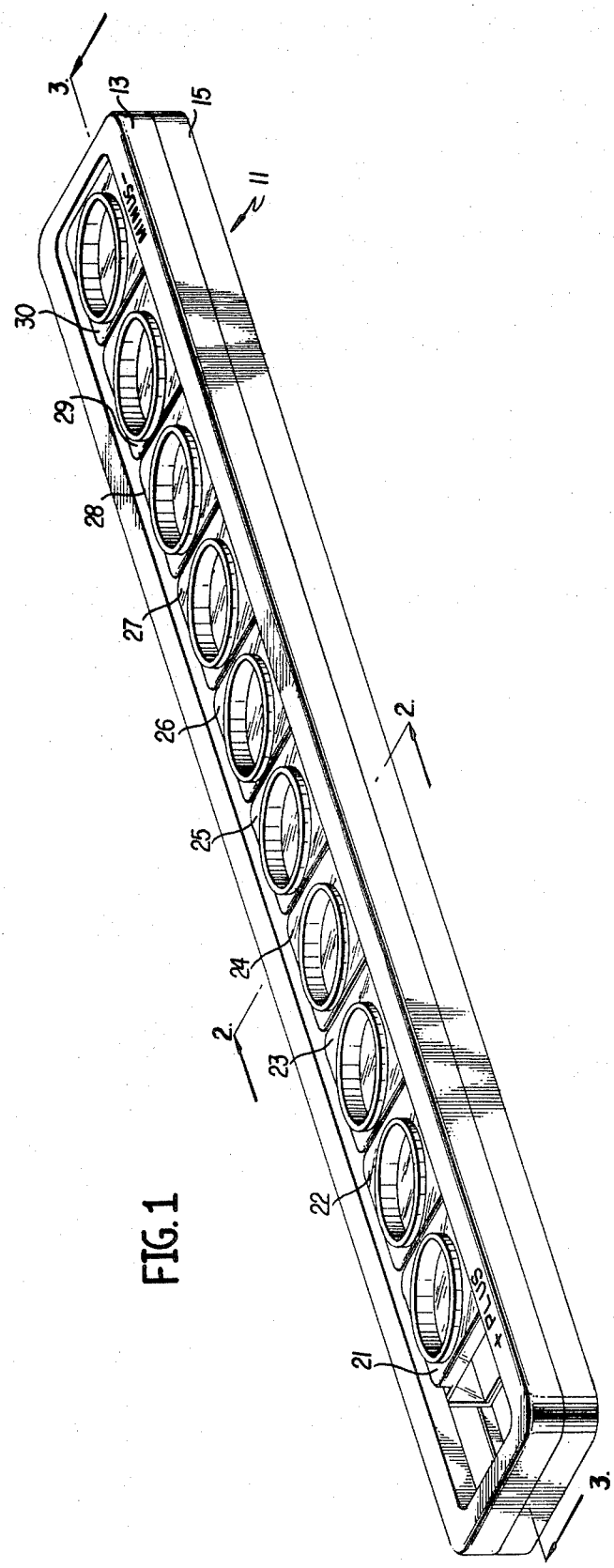

Turning now more specifically to the drawings, there is shown in FIG. 1 a perspective view of the present device which comprises a housing 11 having an upper section 13 and a lower section 15 which may be secured together by any well-known means such as adhesive.

Figure 2:
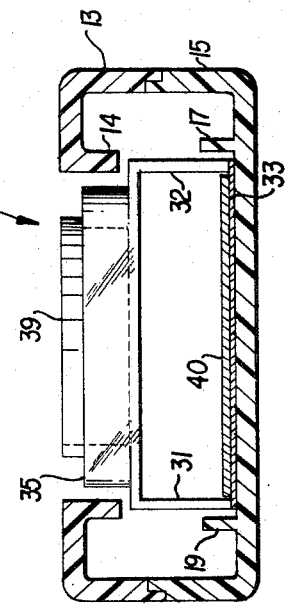
FIG. 2 is a sectional view taken along the lines 2—2 of FIG. 1.

As shown in FIG. 2, the lower housing includes a pair of rails 17 and 19 which extend within the housing longitudinally so as to provide a guide channel for the buttons that are housed therein. The upper channel includes depending inner portions 14 which also further provide a guide means for the buttons as will be seen as the description proceeds.

A series of buttons 21 through 30 are slidably enclosed within housing 11. Since each of the buttons are substantially identical in structure, the numbers used as the description proceeds will be identical regardless of the particular button under discussion.

Figure 3:
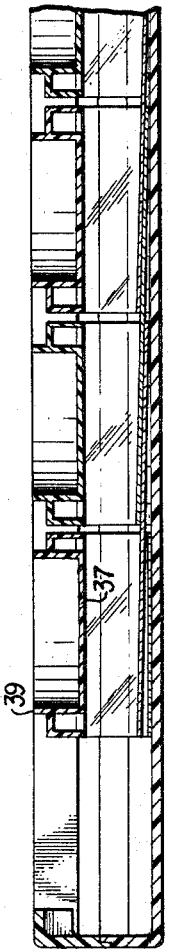
FIG. 3 is a sectional view taken along the lines 3—3 of FIG. 1.

In FIG. 2 the sectional view shows button 25 which includes two wall members 31 and 32 which rest upon a base 33. At the upper part of the wall section, there is a reduced section 35 which includes a re-entrant portion 37 (FIG. 3) having an upper extending lip 39. This may be an integrally formed button which provides a place for a digit such as a finger to be inserted for ease of movement when sliding the buttons back and forth.

FIG. 4 illustrates button 25 which includes in its base 33 a notch 41 which mates with a downwardly extending projection 43 of the button so as to form a mating unit. These two sections may be secured together by any well-known means such as adhesive or the like.

The lower base of re-entrant portion 37 is transparent and the particular desired indicia, such as "5" in FIG. 4, is printed on the base 33 directly below the transparent re-entrant section 37 and is visible therethrough so long as it is not covered by another means.

On every button, with the exception of the first button associated with the lowest number, there is provided an opaque extension of the base which, in effect, is the section noted as 33 in FIG. 4 or as 49 in FIG. 5. This extension rides above the base of the next adjoining button in descending order and covers that particular indicia.

There remains the necessity for covering up the highest digit number, which is number "10" when button 30 is in its far right position. This is accomplished as shown in FIG. 5 by means of an opaque extension 45 secured to the end wall 47 of the housing.

Since the device is provided with a "0" indicia at the left end thereof, and since button 21 must be movable to position adjacent the left end of the housing, no opaque extension is provided for button 21.

The operation of the device may be understood from viewing the various FIGS. and particular FIGS. 6 and 7. Assuming that an addition step is to be made with the device being set as shown in FIG. 6 where all that is visible is the "0" digit. If the number "2" is to be added to "0" then the operator counts over two buttons and moves button 22 to the left or the "plus" direction. Such movement causes buttons 21 and 22 to move to the left and the transparent re-entrant portion of button 22 will then expose the numeral "2" as the only visible number thus giving the true mathematical answer of "0" plus "2." This same addition may be accomplished by counting upward to any additional number of buttons and moving that button to the left. For instance if one started with the device in the position shown in FIG. 7 and counted to the right five more buttons, the button 27 would be moved to the left with the resultant exposition of the numberal "7."

In order to subtract, the movement of the buttons is in the opposite direction. As an example, if one started with the device as shown in FIG. 7 and wished to subtract the number "2," he would count to the left and move button 21 to the right thus exposing the "0" digit as the mathematical answer to "2" minus "2."

As may be seen, the present invention provides a simple arithmetical teaching device for small children which additionally accustoms them to the use of mechanically related instruments.

It is to be understood that the above description and drawings are illustrative only since various components such as the shape of the housing and the configuration of the buttons could be changed without departing from the basic concept of the invention as defined by the following claims.

I claim:
1. An arithmetical teaching device comprising
    a housing,
    a plurality of transparent buttons slidably secured within said housing substantially in alignment therein, said buttons including a base,
    indicia imprinted on the interior of said base of each of said buttons and visible through the upper section thereof, and
    opaque means extending from within selected ones of said buttons for covering and uncovering the indicia of the adjacent button, said opaque means comprising
        a coplanar extension of said base extending over a portion of the base of the adjacent button,
    said housing including one space substantially the same size as one of said buttons, said space being imprinted with the lowest digit relative to said consecutively numbered buttons.
2. The device of claim 1 further comprising
    guide means integral with said housing for maintaining said slidable buttons in alignment.
3. The device of claim 1 further comprising
    means in the upper face of said button for facilitating manual movement therof.
4. The device of claim 3 wherein said means in the upper face of said button comprises
    a re-entrant section adapted to accommodate a digit.

* * * * *